(12) United States Patent  
Lu

(10) Patent No.: US 7,926,938 B2  
(45) Date of Patent: Apr. 19, 2011

(54) HANG-ON EYEGLASSES

(76) Inventor: Hsueh-Yu Lu, Taoyuan (TW)

( * ) Notice: Subject to any disclaimer, the term of this patent is extended or adjusted under 35 U.S.C. 154(b) by 0 days.

(21) Appl. No.: 12/565,726

(22) Filed: Sep. 23, 2009

(65) Prior Publication Data

US 2011/0069273 A1  Mar. 24, 2011

(51) Int. Cl.  
*G02C 3/00* (2006.01)

(52) U.S. Cl. ................. 351/155; 351/52; 2/10; 2/209.13

(58) Field of Classification Search ........... 351/41, 351/51, 52, 155, 158; 2/10, 12, 209.13  
See application file for complete search history.

(56) References Cited

U.S. PATENT DOCUMENTS

| 4,985,935 | A * | 1/1991 | Hur | ........................ 2/10 |
| 7,240,374 | B2 * | 7/2007 | Fang | ............................ 351/155 |

* cited by examiner

*Primary Examiner* — Huy K Mai

(57) ABSTRACT

A hang-on eyeglasses includes a mounting structure formed of a first positioning member and a second positioning member for fastening to the top and bottom walls of the brim of a covering for the head of a person, and an eyeglasses, which has an eyeglass frame pivotally connected to a pivot holder at the second positioning member and two eyeglasses fastened to the eyeglass frame.

8 Claims, 7 Drawing Sheets

HANG-ON EYEGLASSES

BACKGROUND OF THE INVENTION

1. Field of the Invention

The present invention relates to eyeglasses and more particularly, to a hang-on eyeglasses, which is mountable on the visor of a cap and adjustable to the desired angle and distance from the eyes.

2. Description of the Related Art

During an outdoor activity or when driving a car under the radiation of strong sunlight, one may wear a sunglasses to protect the eyes from the damaging rays of the sun. However, wearing a sunglasses may shorten the distance of visual cognition. Further, the light of the sun may be not constantly radiated onto the eyes. When the sunlight is not offending to the eyes, the sunglasses must be removed from the eyes. It is bothersome to frequently put the sunglasses on the eyes and then remove it from the eyes. Sunglasses carrying and storage arrangement is another problem.

There is a known technique to have a sunglasses be directly affixed to the brim of a sun visor or cap. A user can turn the lenses of the sunglasses relative to the brim between a collapsed position and an operative position. However, this mounting structure of this design is complicated and expensive to manufacture. When not in use, the sunglasses cannot be detached from the sun visor or cap.

SUMMARY OF THE INVENTION

The present invention has been accomplished under the circumstances in view. It is one object of the present invention to provide a hang-on eyeglasses, which is mountable on the brim of a sun visor or cap by means of magnetic attraction. It is another object of the present invention to provide a hang-on eyeglasses, which has a simple structure that is inexpensive to manufacture.

To achieve these and other objects of the present invention, a hang-on eyeglasses comprises a mounting structure and an eyeglasses. The mounting structure comprises a first positioning member and a second positioning member for fastening to the top and bottom walls of the brim of a covering for the head of a person. The eyeglasses comprises an eyeglass frame pivotally connected to a pivot holder at the second positioning member and two eyeglasses fastened to the eyeglass frame.

DETAILED DESCRIPTION OF THE PREFERRED EMBODIMENT

Figure 1:
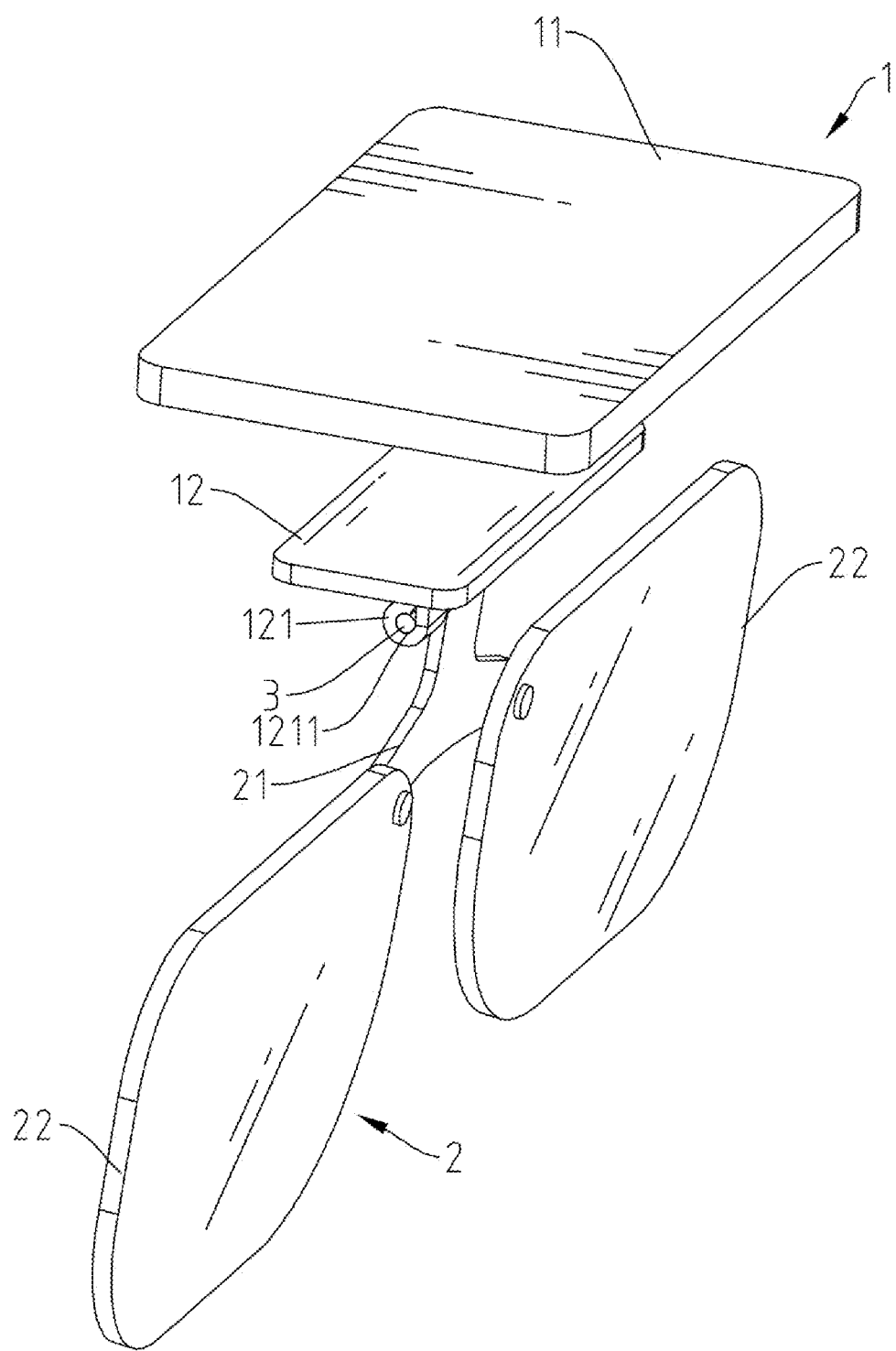
FIG. 1 is an exploded view of a hang-on eyeglasses in accordance with the present invention.
Figure 2:
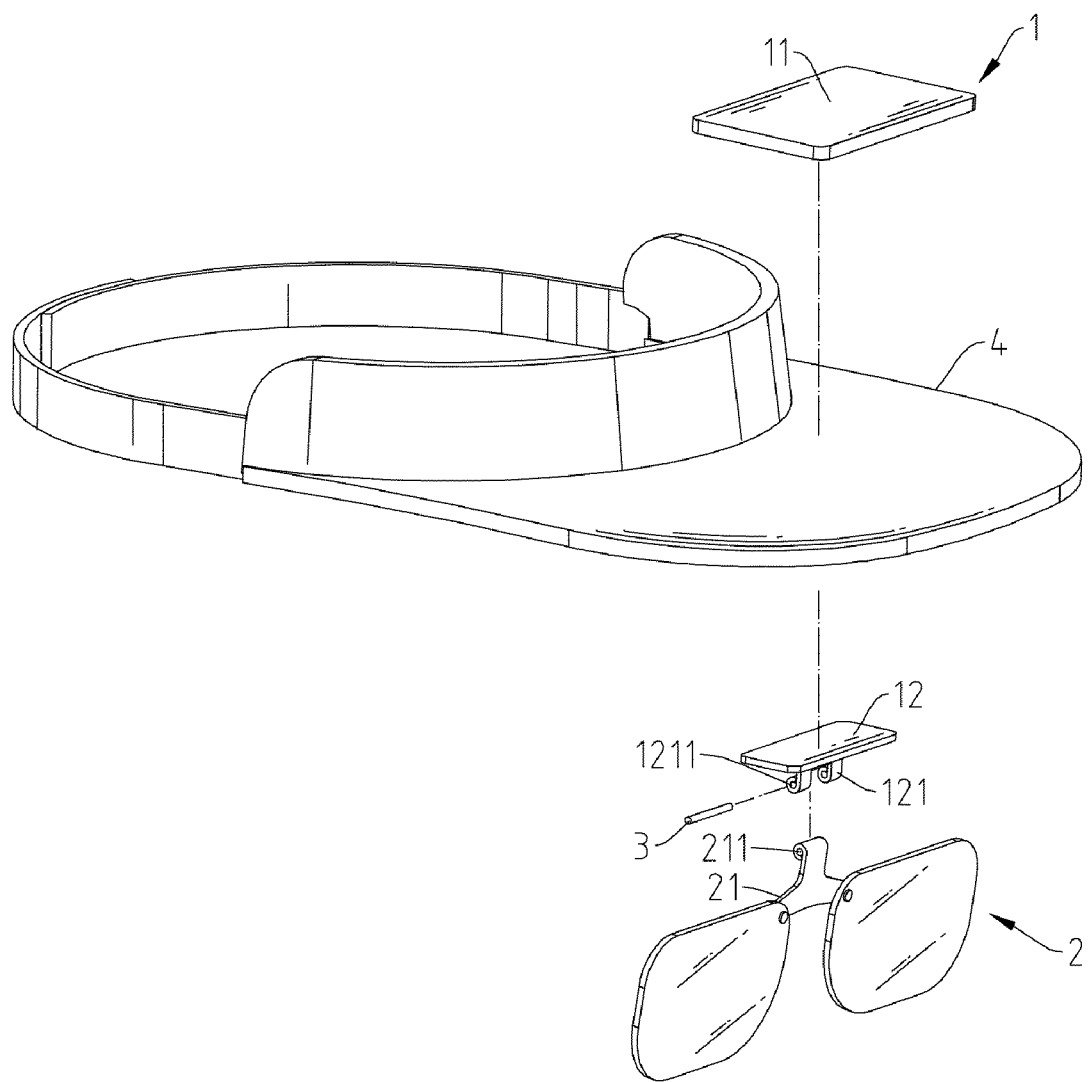
FIG. 2 is an exploded view of the present invention, showing the relationship between the hang-on eyeglasses and the brim of a sun visor.

Referring to FIGS. 1 and 2, a hang-on eyeglasses in accordance with the present invention is shown comprising a mounting structure 1, and an eyeglasses 2.

The mounting structure 1 comprises a first positioning member 11 and a second positioning member 12. According to this embodiment, the first positioning member 11 and the second positioning member 12 are connectable to each other by means of magnetic attraction. Further, the second positioning member 12 comprises a pivot holder 121 located on the bottom side. The pivot holder 121 comprises two pivot holes 1211 axially aligned in line.

The eyeglasses 2 comprises an eyeglass frame 21 and two eyeglass lenses 22. The eyeglass frame 21 comprises a pivot hole 211 located on its one end and pivotally connected between the two pivot holes 1211 of the pivot holder 121 of the second positioning member 12 by a pivot pin 3. The two eyeglass lenses 22 are bilaterally fastened to the other end of the eyeglass frame 21.

Figure 3:
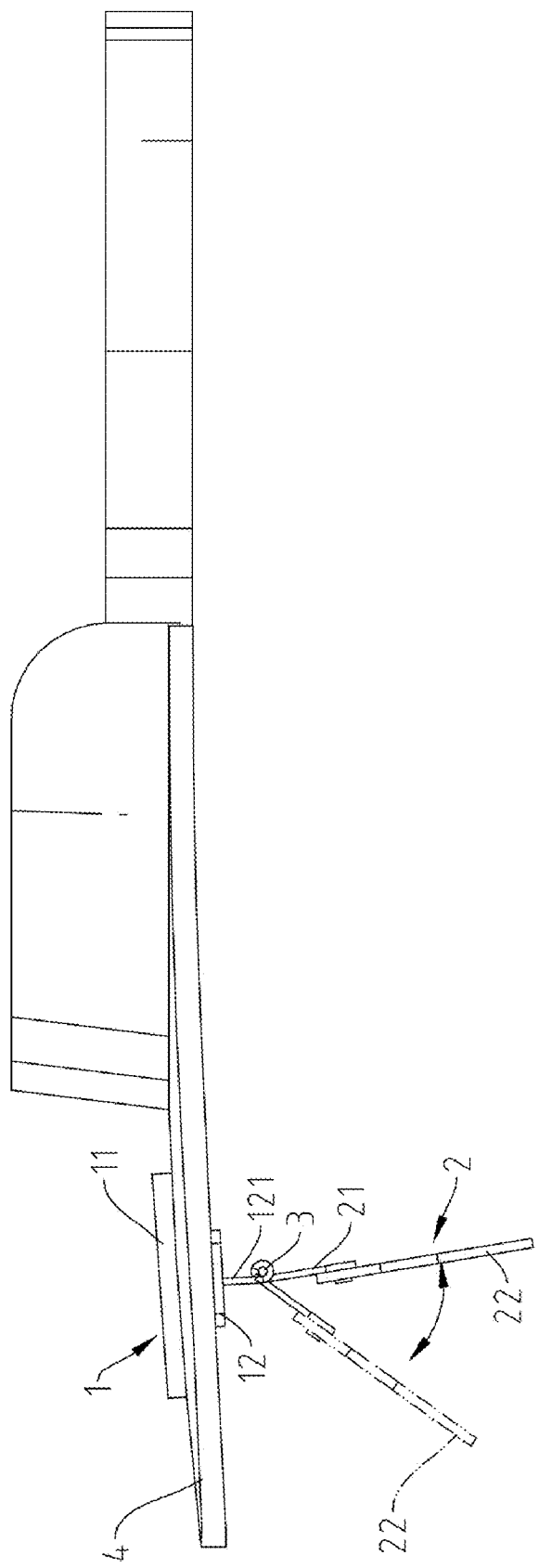
FIG. 3 is a schematic drawing of the present invention, showing the hang-on eyeglasses installed in the brim of the sun visor and the angle of the eyeglasses adjusted.

Referring to FIG. 3 and FIGS. 1 and 2 again, attach the first positioning member 11 to the top wall of the brim 4 of a sun visor, cap or hat, and then attach the second positioning member 12 to the bottom wall of the brim 4. By means of magnetic attraction, the first positioning member 11 and the second positioning member 12 are positively secured to the brim 4. At this time, the user can bias the eyeglass frame 21 or eyeglass lenses 22 of the eyeglasses 2 in direction toward or away from the bottom wall of the brim 4 to adjust the eyeglass lenses 22 to the desired angle.

By means of magnetic attraction, the first positioning member 11 and the second positioning member 12 are secured together. To achieve this function, the first positioning member 11 can be prepared from a magnet, and the second positioning member 12 can be made from a magnetically attractive material, for example, ferrite. Alternatively, the first positioning member 11 can be prepared from ferrite, and the second positioning member 12 can be prepared from a magnet. Alternatively, the first positioning member 11 and the second positioning member 12 can be prepared from magnets.

Figure 4:
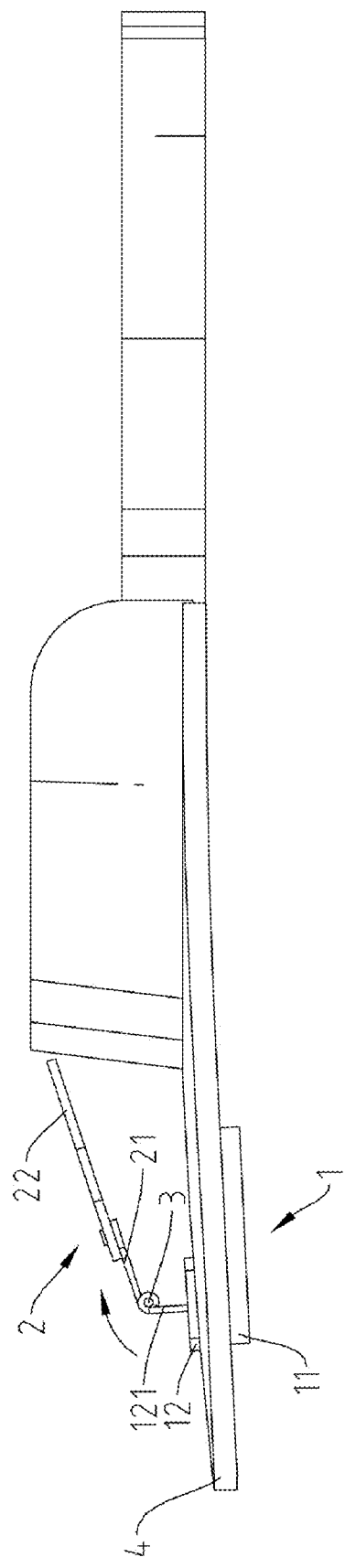
FIG. 4 is a schematic drawing of the present invention, showing the hang-on eyeglasses arranged on the brim of the sun visor in a non-use status.

Referring to FIG. 4, when the hang-on eyeglasses is not to be used within a certain period of time, the user can attach the first positioning member 11 to the bottom wall of the brim 4 and the second positioning member 12 to the top wall of the brim 4, and then bias the eyeglass frame 21 or eyeglass lenses 22 of the eyeglasses 2 in direction toward the bottom wall of the brim 4 to have the eyeglass lenses 22 be closely attached to the top wall of the brim 4.

Figure 5:
FIG. 5 is an elevational view of the present invention, showing an alternate form of the hang-on eyeglasses installed in the brim of a sun visor.

Referring to FIG. 5, the first positioning member 11 can be made having an upright sideboard 111 configured to show a particular design. An ornament can be attached to the sideboard 111 by means of magnetic attraction.

Figure 6:
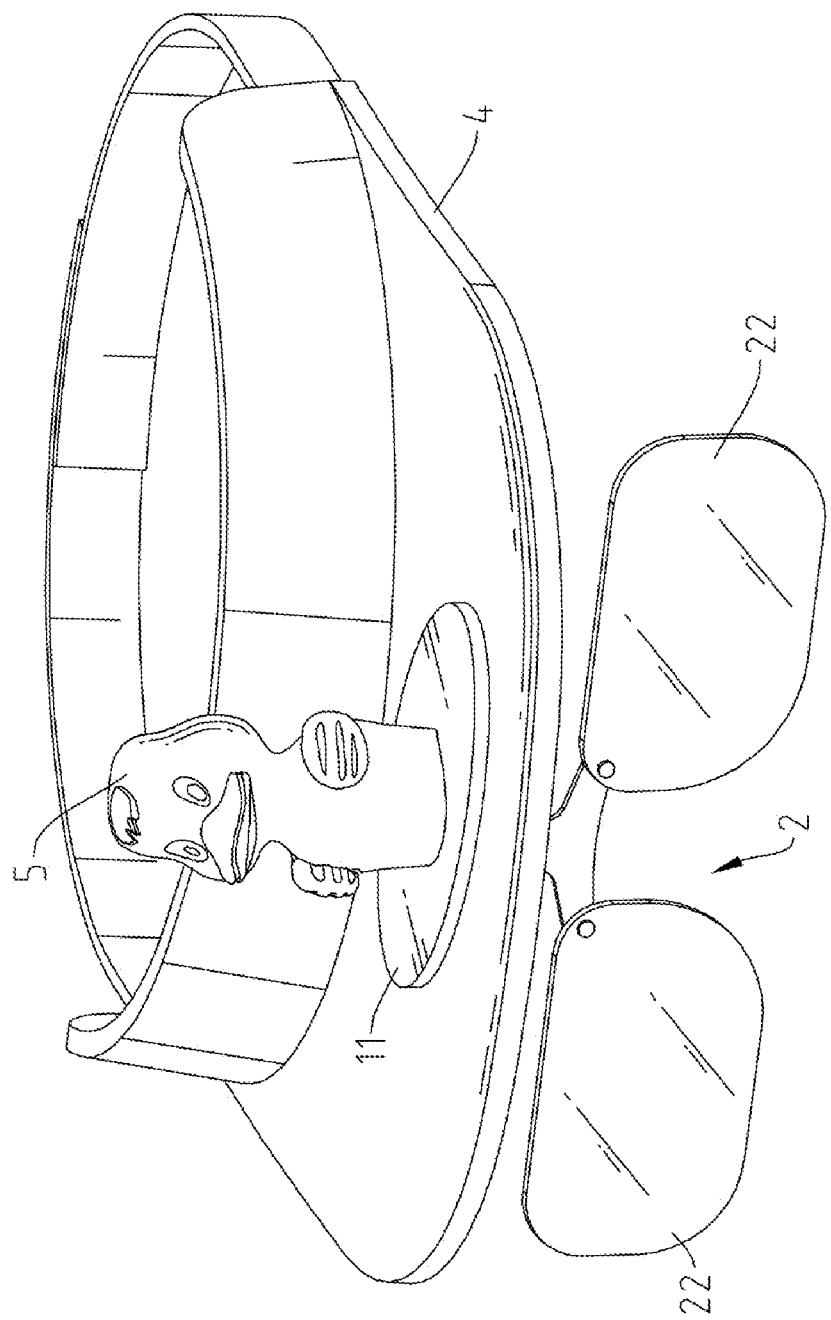
FIG. 6 is an elevational view of the present invention, showing another alternate form of the hang-on eyeglasses installed in the brim of a sun visor.
Figure 7:
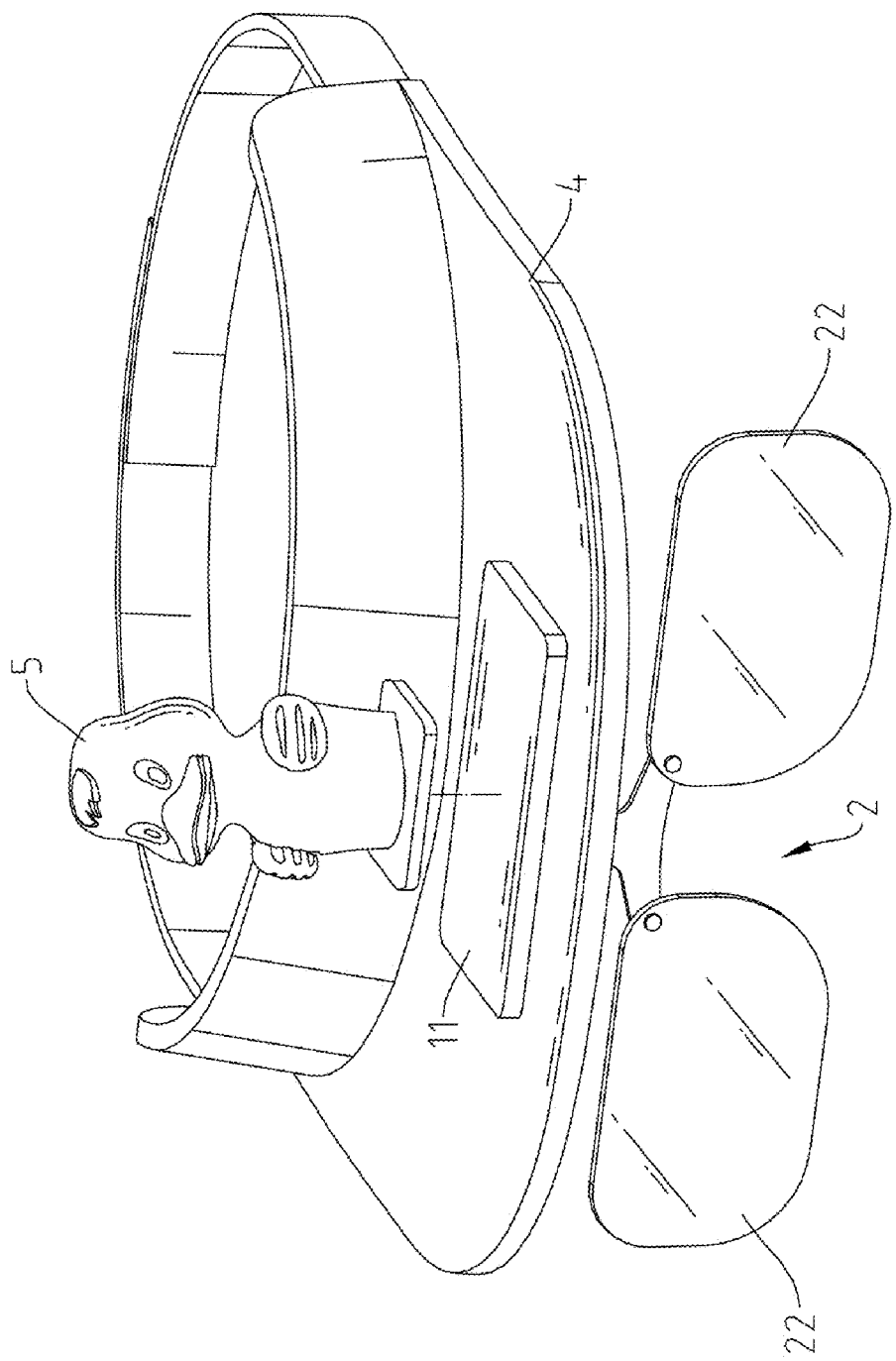
FIG. 7 is an applied view of still another alternate form of the hang-on eyeglasses in accordance with the present invention.

Referring to FIGS. 6 and 7, the first positioning member 11 carries an ornament 5 on the top side thereof. The ornament 5 can be fixedly mounted on the top wall of the first positioning member 11, as shown in FIG. 6. Alternatively, the ornament 5 can be detachably secured to the first positioning member 11 by means of magnetic attraction, as shown in FIG. 7.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. Hang-on eyeglasses, comprising:
   a mounting structure, said mounting structure comprising a first positioning member removably disposable on a first side of a brim of headwear and a second positioning member removably disposable on a second side of the brim, wherein the first positioning member and the second positioning member are comprised of materials that are magnetically attracted to each other so that the first positioning member is magnetically attracted to the second positioning member to sandwich the brim between the first and second positioning members, the second positioning member comprising a pivot holder; and
   eyeglasses securable to said mounting structure, said eyeglasses comprising an eyeglass frame pivotally connected to said pivot holder of said second positioning member and at least a lens fastened to said eyeglass frame.

2. The hang-on eyeglasses as claimed in claim 1, wherein said pivot holder of said second positioning member comprises two pivot holes aligned in line; said eyeglass frame comprises a pivot hole disposed at one end thereof and pivotally connected between the pivot holes of said pivot holder.

3. The hang-on eyeglasses as claimed in claim 2, further comprising a pivot pin mounted in the pivot holes of said pivot holder and the pivot hole of said eyeglass frame to pivotally secure said eyeglass frame to said pivot holder.

4. The hang-on eyeglasses as claimed in claim 1, wherein said first positioning member is prepared from a magnet, and said second positioning member is prepared from a magnetically attractive material.

5. The hang-on eyeglasses as claimed in claim 1, wherein said first positioning member is prepared from a magnetically attractive material, and said second positioning member is prepared from a magnet.

6. The hang-on eyeglasses as claimed in claim 1, wherein said first positioning member and said second positioning member are respectively prepared from a magnet.

7. The hang-on eyeglasses as claimed in claim 1, wherein said first positioning member comprises an upright sideboard.

8. The hang-on eyeglasses as claimed in claim 1, wherein said first positioning member carries an ornament.

* * * * *